(12) United States Patent
Narain

(10) Patent No.: US 10,250,444 B2
(45) Date of Patent: Apr. 2, 2019

(54) HYBRID SDN/LEGACY POLICY ENFORCEMENT

(71) Applicant: Vencore Labs, Inc., Basking Ridge, NJ (US)

(72) Inventor: Sanjai Narain, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 301 days.

(21) Appl. No.: 15/199,018

(22) Filed: Jun. 30, 2016

(65) Prior Publication Data

US 2017/0006067 A1  Jan. 5, 2017

Related U.S. Application Data

(60) Provisional application No. 62/188,354, filed on Jul. 2, 2015.

(51) Int. Cl.
| | |
|---|---|
| *H04L 29/06* | (2006.01) |
| *H04L 12/24* | (2006.01) |
| *H04L 29/08* | (2006.01) |

(52) U.S. Cl.
CPC ...... *H04L 41/0893* (2013.01); *H04L 41/0813* (2013.01); *H04L 41/0823* (2013.01);
(Continued)

(58) Field of Classification Search
None
See application file for complete search history.

(56) References Cited

U.S. PATENT DOCUMENTS

| | | | | |
|---|---|---|---|---|
| 6,640,238 | B1 * | 10/2003 | Bowman-Amuah | ... G06F 9/541 709/201 |
| 6,934,749 | B1 * | 8/2005 | Black | ........ G06F 1/14 709/217 |

(Continued)

OTHER PUBLICATIONS

Wang, Hui-Ming et al. Hybrid Cooperative Beamforming and Jamming for Physical-Layer Security of Two-Way Relay Networks. IEEE Transactions on Information Forensics and Security, vol. 8, Issue: 12. https://ieeexplore.ieee.org/stamp/stamp.jsp?tp=&arnumber=6646279 (Year: 2013).*

(Continued)

*Primary Examiner* — Jeremiah L Avery
(74) *Attorney, Agent, or Firm* — Heslin Rothenberg Farley & Mesiti P.C.

(57) ABSTRACT

A method, system, and computer program product configure elements of a hybrid network. The method may include a processor obtaining at a first controller communicatively coupled to components of a hybrid network, a requirement for the hybrid network; the components include a first component type and a second component type. After obtaining the requirement, the processor generates a plan to configure a component of the first component type and a component of the second component type. The processor configures the component of the first component type according to a first portion of the plan by utilizing a security protocol over an unsecured connection. The processor configures the component of the second component type according to a second portion of the plan by transmitting this portion to a controller of components of the second component type in the hybrid network. The controller configures the component upon receipt of the portion.

16 Claims, 13 Drawing Sheets

(52) U.S. Cl.
CPC .......... *H04L 41/0873* (2013.01); *H04L 63/20* (2013.01); *H04L 67/10* (2013.01)

(56) References Cited

U.S. PATENT DOCUMENTS

| | | | | |
|---|---|---|---|---|
| 7,143,153 B1* | 11/2006 | Black | ................. | H04L 41/0681 709/223 |
| 2002/0001307 A1* | 1/2002 | Nguyen | ............... | G01R 31/025 370/386 |
| 2002/0057018 A1* | 5/2002 | Branscomb | ............... | G06F 1/14 307/42 |
| 2002/0116485 A1* | 8/2002 | Black | ...................... | H04L 29/06 709/223 |
| 2002/0165961 A1* | 11/2002 | Everdell | ................. | H04L 41/22 709/225 |
| 2004/0031030 A1* | 2/2004 | Kidder | ..................... | G06F 1/14 717/172 |
| 2005/0027870 A1* | 2/2005 | Trebes, Jr. | ............. | H04B 1/715 709/227 |
| 2005/0198247 A1* | 9/2005 | Perry | ................... | H04L 7/0008 709/223 |
| 2009/0070786 A1* | 3/2009 | Alves | ..................... | G06F 9/541 719/318 |
| 2013/0343407 A1* | 12/2013 | Stroud | ................... | H04L 69/16 370/474 |
| 2013/0346736 A1* | 12/2013 | Cook | ..................... | G06F 9/4416 713/2 |
| 2013/0346756 A1* | 12/2013 | Cook | ..................... | G06F 21/00 713/189 |
| 2013/0347103 A1* | 12/2013 | Veteikis | .................. | H04L 43/04 726/22 |
| 2015/0052253 A1* | 2/2015 | Johnson | ............. | H04L 61/1511 709/226 |

OTHER PUBLICATIONS

Katayama, Minoru et al. A multi-protocol wireless multi-hop network employing a new efficient hybrid routing scheme. The 57th IEEE Semiannual Vehicular Technology Conference, 2003. VTC 2003-Spring. https://ieeexplore.ieee.org/stamp/stamp.jsp?tp=&arnumber=1207178 (Year: 2003).*

Cao, Kuo et al. Hybrid Relaying and Jamming for Physical Layer Security Improvement in Two-Way Relay Networks. 2013 International Conference on Wireless Communications and Signal Processing. https://ieeexplore.ieee.org/stamp/stamp.jsp?tp=&arnumber=6677282 (Year: 2013).*

* cited by examiner

300

310

One or more programs executing at a controller obtain a requirement for a hybrid network comprises of elements that include SDN components and legacy components.

320

Responsive to obtaining the requirement, the one or more programs generate a plan for a new configuration for elements of the hybrid network, wherein the new configuration applies to at least one legacy component and at least one SDN component of the hybrid network to satisfy the requirement

330

One or more programs configure the legacy component according to the plan utilizing a security protocol for use over an unsecured connection.

340

One or more programs communicate the plan to an SDN controller, which, upon receipt of the plan, configures the SDN component in accordance with the plan.

350

One or more programs receive updated configuration and state information from the components, based on new configurations in accordance with the plan (as necessitated by the requirement).

FIG. 3

Specifying Hybrid Network in DADC
Only Requirements (What), Not Configurations (How)

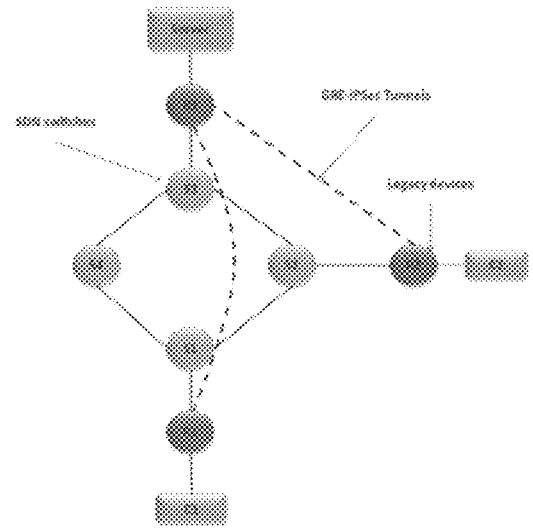

```
sdn flows
  taps1 taps3 ip address R1 eth0 0 0 ip address R3 eth0 0 0 bw 1
  taps2 taps3 ip address R2 eth0 0 0 ip address R3 eth0 0 0 bw 1
  taps3 taps1 ip address R3 eth0 0 0 ip address R1 eth0 0 0 bw 10
  taps3 taps2 ip address R3 eth0 0 0 ip address R2 eth0 0 0 bw 10
on graph
  s1 p2 s2 p2
  s2 p3 s3 p2
  s1 p3 s4 p2
  s4 p3 s3 p3
  taps1 e1 s1 p1
  taps2 e1 s2 p1
  s3 p1 taps3 e1
  taps4 e1 s4 p1 capacity s1 p2 s2 p2 = 1
capacity s2 p3 s3 p2 = 1
capacity s1 p3 s4 p2 = 1
capacity s4 p3 s3 p3 = 1
capacity s2 p2 s1 p2 = 1 flow on node s1 ip address R2 eth0 0 0 ip address R3 eth0 0 0 = 1 gre ipsec tunnel options 10.0.0.0 30 R1 Tunnel0 eth0 R3 Tunnel0 eth0 123 esp-des esp-md5-hmac
gre ipsec tunnel options 10.0.0.4 30 R2 Tunnel0 eth0 R3 Tunnel1 eth0 123 esp-des esp-md5-hmac subnet 172.16.11.0 30 C1 eth0 R1 eth1
subnet 1.0.0.0 30 R1 eth0 taps1 e0 next hop C1 0.0.0.0 0 = ip address R1 eth1
interface next hop R1 0.0.0.0 0 eth0
```

FIG. 6

Configuration variable values automatically generated by constraint solver ip_address('R1',eth0) = '1.0.0.1'
ip_address('R3',eth0) = '3.0.0.2' sdn_accept_flow(s1,0,'1.0.0.1',32,0,'3.0.0.2',32,0,0) = 2
sdn_accept_flow(s2,0,'1.0.0.1',32,0,'3.0.0.2',32,0,0) = 3
sdn_accept_flow(s3,0,'1.0.0.1',32,0,'3.0.0.2',32,0,0) = 1 gre_local_physical('R1','Tunnel0') = '1.0.0.1'
gre_remote_physical('R3','Tunnel0') = '1.0.0.1' ipsec_ea('R1',eth0,'R3',eth0) = 'esp-des'
ipsec_ha('R1',eth0,'R3',eth0) = 'esp-md5-hmac'
ipsec_key('R1',eth0,'R3',eth0) = 123
ipsec_remote('R1',eth0,'R3',eth0) = '3.0.0.2'
ipsec_acl_id('R1',eth0,'R3',eth0) = gre_ipsec_R1_eth0_R3_eth0
acl_action('0000','R1',gre_ipsec_R1_eth0_R3_eth0,'1.0.0.1',32,0,'3.0.0.2',32,0,47) = permit next_hop('C1','0.0.0.0',0) = '172.16.11.2'
next_hop('C2','0.0.0.0',0) = '172.16.22.2'
next_hop('Server','0.0.0.0',0) = '172.16.33.2' interface_next_hop('R1','0.0.0.0',0) = eth0
interface_next_hop('R2','0.0.0.0',0) = eth0
interface_next_hop('R3','0.0.0.0',0) = eth0
interface_next_hop('R4','0.0.0.0',0) = eth0

FIG. 7

Platform-specific configurations for Linux and CORE automatically generated

```
===== R3.sh =====
ip tunnel add Tunnel0 mode gre local 3.0.0.2 remote 1.0.0.1
    ttl 225
ifconfig Tunnel0 multicast
ifconfig Tunnel0 10.0.0.2 netmask 255.255.255.252 up
ip tunnel add Tunnel1 mode gre local 3.0.0.2 remote 2.0.0.1
    ttl 225
ifconfig Tunnel1 multicast
ifconfig Tunnel1 10.0.0.6 netmask 255.255.255.252 up
ifconfig eth0 3.0.0.2 netmask 255.255.255.252 up
ifconfig eth1 172.16.33.2 netmask 255.255.255.252 up > /usr/local/etc/quagga/Quagga.conf ip route add default dev eth0 cat > /etc/ipsec.d/adc.conf << HEAR_HEAR conn R1_eth0
    type=tunnel
    authby=secret
    left=3.0.0.2
    leftsubnet=3.0.0.2/32
    right=1.0.0.1
    rightsubnet=1.0.0.1/32
    ike=esp-md5-hmac
    esp=esp-des
    auto=start

**********
```

```
node n5 {
  type router
  model router
  network-config {
    hostname R3
    !
    interface Tunnel0
      ip address 10.0.0.2/30
    !
    interface Tunnel1
      ip address 10.0.0.6/30
    !
    interface eth0
      ip address 3.0.0.2/30
    !
    interface eth1
      ip address 172.16.33.2/30
    !
  }
  canvas c1
  iconcoords {291.04 160.21}
  labelcoords {291.04 190.21}
  interface-peer {eth0 n9}
  interface-peer {eth1 n6}
  custom-config {
    custom-config-id service:UserDefined
    custom-command UserDefined
    config {

SDN and Mininet configurations automatically generated

```
from mininet.net import Mininet
from mininet.node import Controller, RemoteController,
    OVSController
from mininet.node import CPULimitedHost, Host, Node
from mininet.node import OVSKernelSwitch, UserSwitch
from mininet.node import IVSSwitch
from mininet.cli import CLI
from mininet.log import setLogLevel, info
from mininet.link import TCLink, Intf
from subprocess import call def myNetwork():
    net = Mininet( topo=None, build=False, ipBase='10.0.0.0/8')

c0=net.addController(name='c0',
            controller=RemoteController,
            ip='127.0.0.1',
            protocol='tcp',
            port=6633)

s1 = net.addSwitch('s1', cls=OVSKernelSwitch,
        listenPort=6641)
    s2 = net.addSwitch('s2', cls=OVSKernelSwitch,
        listenPort=6642)
    s3 = net.addSwitch('s3', cls=OVSKernelSwitch,
        listenPort=6643)
    s4 = net.addSwitch('s4', cls=OVSKernelSwitch,
        listenPort=6644)

..........
```

* Python script reads abstract solution file, generates the SDN routes and applies them to SDN devices in Mininet

FIG. 11

HYBRID SDN/LEGACY POLICY ENFORCEMENT

CROSS-REFERENCE TO RELATED APPLICATIONS

This application claims priority to U.S. Provisional Application No. 62/188,354 filed Jul. 2, 2015, entitled, "HYBRID SDN/LEGACY POLICY ENFORCEMENT AND CONFIGURATION AGREEMENT PROTOCOL" which is incorporated herein by reference in its entirety.

FIELD OF INVENTION

The Invention relates generally to systems and methods that increase network efficiency specifically related to ease, speed, and accuracy of configuration and reconfiguration of hybrid networks.

BACKGROUND OF INVENTION

Hybrid software-defined networking (SDN) and hybrid networks present a number of challenges. Challenges arise when planning hybrid SDN and legacy networks, including but not limited to, deploying new protocols, implementing rapid, error-free configuration, maintaining a highly skilled workforce, and managing merged control and data planes.

Although the implementation of a pure SDN network simplifies the network itself, this implementation is not only not always an option, it is also uniquely challenging. A pure SDN solution uses switches that are limited to simple tasks like forwarding. Additionally, SDN networks program all control functionality in a central controller and use an out-of-band network between the controller and switches. Because of these limitations, programming is difficult, it is unclear how to scale centralized control, there is no encryption (SDN has no encryption), and the necessity of an out-of-band network adds complexity to the data plane.

SUMMARY OF INVENTION

Shortcomings of the prior art are also overcome and additional advantages are provided through the provision of a method to 1) compute paths consisting of traditional routers and SDN switches; 2) verify security properties such as the containment of an adversary; 3) trace the intrusion and exfiltration vector of an adversary; and/or 4) find a path to a destination that avoids compromised nodes, is permitted by existing firewall policies and satisfies capacity and bandwidth constraints. A hybrid network into which aspects of embodiments of the present invention are implemented may include layer 3 (L3routing, L3 security, SDN routing, legacy systems, and distributed control.

Shortcomings of the prior art are also overcome and additional advantages are provided through the provision of a method to configure elements of a hybrid network to meet a requirement, the method including: obtaining, by the one or more processors, at a first controller communicatively coupled to components of a hybrid network, a requirement for the hybrid network, wherein the components of the hybrid network comprise a first component type and a second component type, wherein the first component type and the second component type are configured utilizing different protocols; responsive to obtaining the requirement, generating, by the one or more processors, based on the requirement, a plan to configure at least one component of the first component type and at least one component of the second component type; configuring, by the one or more processors, the at least one component of the first component type according to a first portion of the plan by utilizing a security protocol over an unsecured connection; and configuring, by the one or more processors, the at least one component of the second component type according to the second portion of the plan, wherein the configuring comprises: transmitting, by the one or more processor, to a controller of components of the second component type in the hybrid network, a second portion of the plan, wherein the controller configures the at least one component of the second component type according to the second plan portion of the plan, upon receipt of the second portion of the plan.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 3 is a workflow that illustrates certain aspects of an embodiment of the present invention.

FIGS. 6-11 illustrate certain functionalities of various embodiments of the present invention.

DETAILED DESCRIPTION OF THE INVENTION

Figure 1:
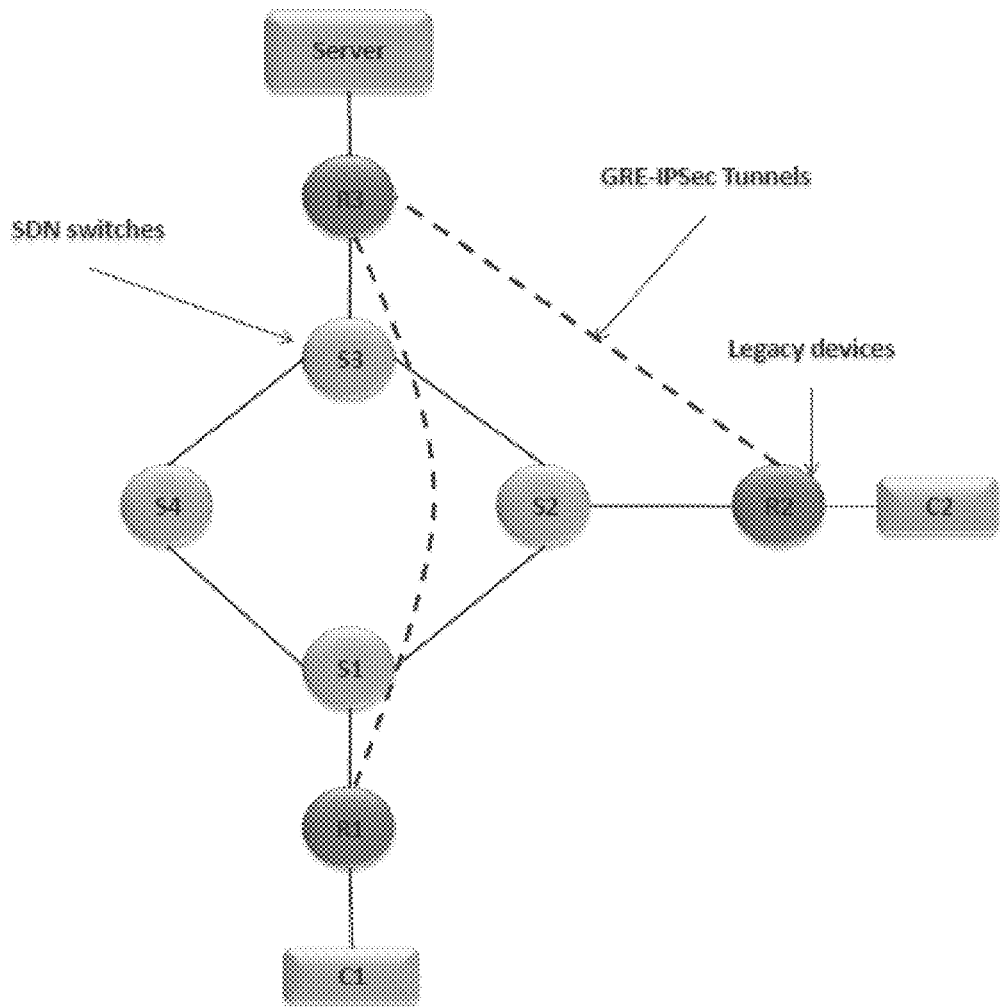
FIG. 1 depicts a hybrid network depicting demonstrates aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application. Program code may refer to one or more programs executed by one or more processors in a computing environment.

Despite the great potential of software-defined networking, its assimilation into legacy networks is likely to be gradual as many entities utilize networks that include legacy systems and a wholesale swap of technology is expensive, inefficient, and potentially extremely problematic. Instead, network operators will likely replace parts of their networks with SDN to gain experience with it and understand how its strengths can be combined with those of legacy networks. Thus, tools are needed to conceptualize overall security and functionality requirements of a network and plan how these can be satisfied using an SDN part and a legacy part as appropriate. Embodiments of the present invention provide tools to manage hybrid network, which is a network that includes both SDN and legacy components.

Embodiments of the present invention find paths in networks satisfying access-control, capacity, bandwidth and routing policy constraints. Embodiments of the present invention identify and account for these constraints by utilizing simultaneous multi-threading (SMT) solver. Thus, embodiments of the present invention may be used to: 1) compute paths in a hybrid network consisting of traditional routers and Software-Defined Networking switches; 2) verify security properties such as the containment of an adversary (i.e., there is no path from a compromised node to a sensitive server); 3) trace the intrusion and exfiltration vector of an adversary; and/or 4) find a path to a destination that avoids compromised nodes, is permitted by existing firewall policies and satisfies capacity and bandwidth constraints.

In accordance with an embodiment of the present invention, a Distributed Assured and Dynamic Configuration system (DADC) has been developed that assists in addressing the hybrid network challenges discussed. Among the advantages of utilizing this system is that it addresses the needs that motivated SDN, but works with full-featured devices. Thus, there is no need to reinvent the mature, scalable, distributed protocols, including those for encryption. Another advantage of utilizing this system in accordance with various aspects of the present invention is that it allows specification of network requirements. In embodiments of the present invention, DADC also synthesizes accurate configurations and improves efficiency of synthesis by several orders of magnitude over manual practice. In one example, configurations have achieved an accuracy of 100%. In accordance with certain aspects of an embodiment of the present invention, utilizing DADC can also automates central intellectual tasks of solving millions of dependencies between millions of configuration variables in seconds using SAT solvers. DADC can also be integrated with other systems (e.g., OpenFlow) to configure SDN switches. Unlike pure SDN, DADC also distributes control, ensuring scalability and control-plane fault-tolerance. In an embodiment of the present invention, consistency is ensured with group communication protocols. DADC may also provide in-band control channel without affecting the data plane.

By utilizing a DADC system (in an embodiment of the present invention), DADC assures SDN and hybrid networks (networks that include legacy systems) will be configured faster with fewer errors by less skilled staff, and DADC will preserve investment in legacy networks. This feature is an advantage over existing systems and as discussed herein, the present invention is routed in computer technology as aspects of embodiments of the present invention represent improvements to network configurations technology.

FIG. 1 illustrates a hybrid network upon which program code executed by a processor, in accordance with an embodiment of the present invention, may: 1) compute paths consisting of traditional routers and SDN switches; 2) verify security properties such as the containment of an adversary; 3) trace the intrusion and exfiltration vector of an adversary; and/or 4) find a path to a destination that avoids compromised nodes, is permitted by existing firewall policies and satisfies capacity and bandwidth constraints. As seen in FIG. 1, the hybrid network includes layer 3 (L3) routing, L3 security, SDN routing, and distributed control.

Referring to FIG. 1, the hybrid network includes L3 routing. Specifically, in this non-limiting example of a hybrid network, there is a flow between Client1 (C1) and Server with a certain bandwidth, there is a flow between Client2 (C2) and Server with a certain bandwidth, routers R1 and R3 are reachable, and routers R2 and R3 are reachable.

Referring to FIG. 1, the hybrid network includes L3 security. There is a Generic Routing Encapsulation (GRE)/Internet Protocol Security (IPSec) tunnel between R1 and R3. There is a GRE/IPSec tunnel between R2 and R3.

Referring the FIG. 1, the hybrid network includes SDN Routing. Specifically, R1 and R2 are reachable via SDN, R2 and R3 are reachable via SDN, and R1 and R3 are reachable only via S2. As depicted in the hybrid network in FIG. 1, the capacity of each link is greater than the sum of bandwidth of all flows passing through the link.

Referring the FIG. 1, the hybrid network includes distributed control. Specifically, each SDN switch is in a different administrative domain.

As aforementioned, hybrid networks, such as the example in FIG. 1, present challenges including deploying new protocols, implementing rapid, error-free configuration, maintaining a highly skilled workforce, and managing merged control and data planes. The different configurations within a given hybrid network may add to these challenges. Turning to FIG. 1, the hybrid network used as a non-limiting example includes many configuration variables, in this example, approximately two hundred and fifty (250). Configurations to the hybrid network of FIG. 1 include, but are not limited to L3 configurations and SDN configurations. L3 configurations may include, IP addresses, Masks, GRE source, destination, IPSec source, destination, encryption, hash, key, mode, Routing GRE into IPSec, Next hops, and Linux versions of these L3 configurations. SDN configurations include, but are not limited to, Mapping flows to SDN links, SDN routes, OpenFlow versions of configurations, and Controller to device mappings.

As seen in FIG. 1, in a hybrid network, there are multiple dependencies that can affect attempts at network configuration. For example, there is a large number of complex dependencies between various elements and configurations of those elements. Configuring and reconfiguring hybrid networks is an insurmountable challenge without the assistance of the present invention. An embodiment of the present invention, referred to as a DADC system, can generate these configurations and dependencies accurately, in seconds.

Figure 2:
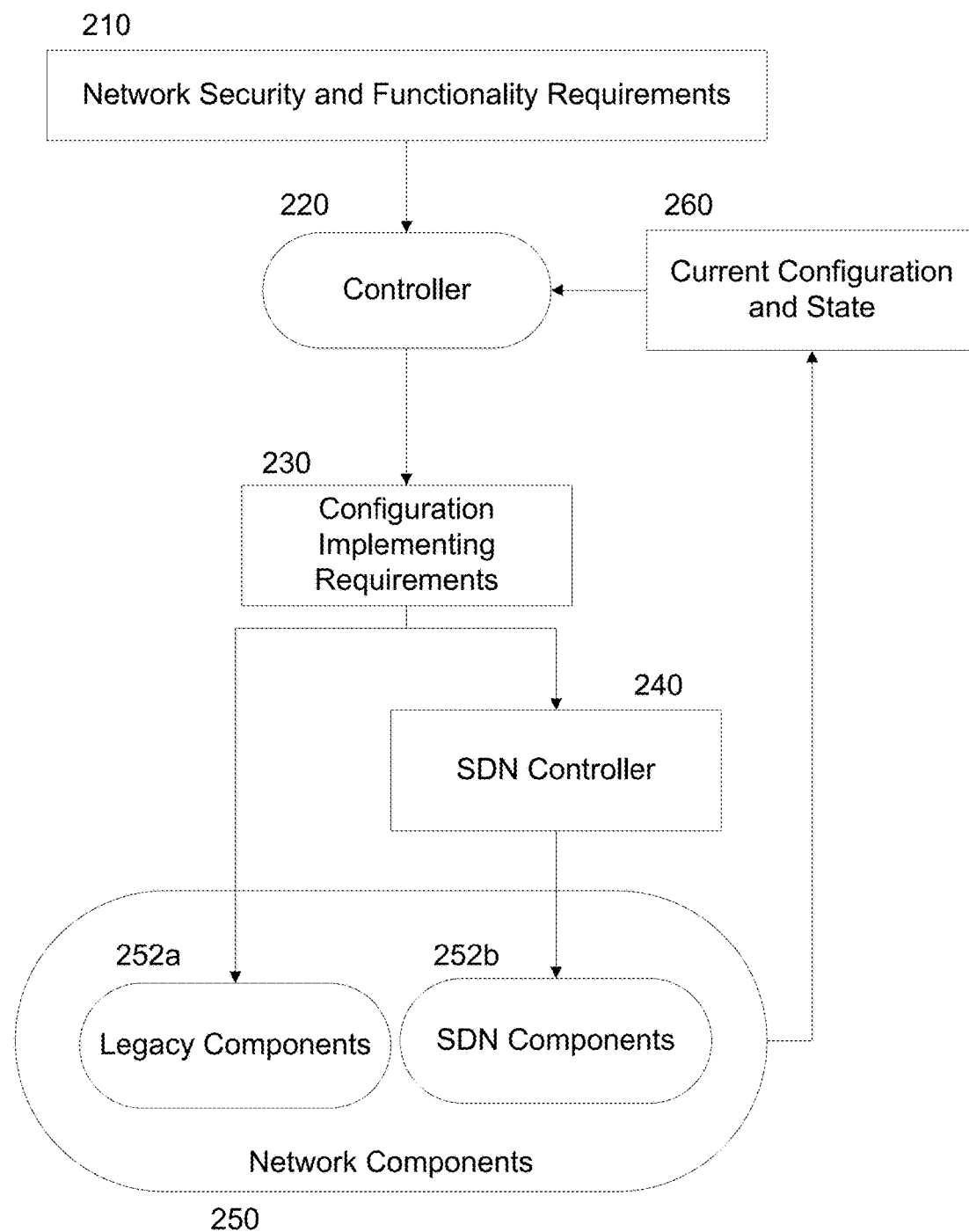
FIG. 2 depicts an example technical architecture for a DADC controller, in accordance with certain aspects of an embodiment of the present invention.

FIG. 2 depicts an example technical architecture for a controller 220 (e.g., a DADC controller), in accordance with certain aspects of an embodiment of the present invention. As seen in this example, program code executed by a processor enables a controller to obtain security and functionality requirements 210 for a given network. The program code also enables the controller to receive current configurations and state information 260 from components of the hybrid network 250, including, in the example of FIG. 2, legacy (e.g., L3) components 252a and SDN components 252*b*. Responsive to receiving the security and functionality requirements and the current configurations, the program code generates new configurations for elements of the hybrid network. In an embodiment of the present invention, these configurations include configurations for L3 components and SDN components of the hybrid network. The program code communicates the new configurations to the components. In an embodiment of the present invention, the program code utilizes the controller 230 to send configurations information to L3 elements of the hybrid network. In an embodiment of the present invention, the controller 230 communicates new configurations to an SDN controller 240 and the SDN controller 240 sends the new configurations 230 (i.e., reconfigures) the SDN elements 252*b* of the hybrid network.

Returning to FIG. 2, the DADC controller 220 in and embodiment of the present invention may comprise engines for configuration synthesis, diagnosis, minimum-cost repair, path planning, moving-target defense, verification, and/or visualization. In one non-limiting example, a DADC controller may support the following protocols: protocols supported: IP, IPv6 IPSec, RIP, OSPF, Static, ACL, HSRP, VLAN, GRE, mGRE, QoS, and/or Openflow. The DADC controller 220 may support devices that include but are not limited to, Cisco, Linux, Juniper, and/or SDNVia.

Returning to FIG. 2, in an embodiment of the present invention, the program code executing at the DADC controller 220 may send new configurations 230 to legacy (e.g., L3) elements of a hybrid network 252*a* via SNMP/SSH, both in-band and/or out-of-band. The SDN controller 240, upon obtaining new configurations from the DADC controller, 220 may send new configurations to SDN elements of the hybrid network 252*b* using SDNVia Pox/Openflow.

FIG. 3 is a workflow that illustrates certain aspects of an embodiment of the present invention. In an embodiment of the present invention, one or more programs executing at a controller obtain a requirement for a hybrid network comprises of elements that include SDN components and legacy components (310). In an embodiment of the present invention, the requirement may include one or more of a security of a functionality requirement for the hybrid network. Responsive to obtaining the requirement, the one or more programs generate a plan for a new configuration for elements of the hybrid network, wherein the new configuration applies to at least one legacy component and at least one SDN component of the hybrid network to satisfy the requirement (320). In an embodiment of the present invention, the one or more programs generate sub-requirements based on the requirement. The sub-requirements may include specific functionality/connectivity changes to components in the network needed to meet the requirement. The plan may include the steps for implementing changes to components that would satisfy the requirement by satisfying the sub-requirements.

Returning to FIG. 3, the one or more programs configure the legacy component according to the plan utilizing a security protocol for use over an unsecured connection (330). The one or more programs communicate the plan to an SDN controller, which, upon receipt of the plan, configures the SDN component in accordance with the plan (340). The one or more programs receive updated configuration and state information from the components, based on new configurations in accordance with the plan (as necessitated by the requirement) (350). In an embodiment of the present invention, the legacy component and the SDN component may be configured concurrently. In an embodiment of the present invention, the security protocol utilized by the one or more programs is Simple Network Management Protocol (SNMP), an Internet-standard protocol for collecting and organizing information about managed devices on IP networks and for modifying that information to change device behavior. In an embodiment of the present invention, the security protocol utilized by the one or more programs is Secure Shell (SSH), a cryptographic network protocol for operating network services securely over an unsecured network.

Embodiments of the present invention include tools that conceptualize overall security and functionality requirements of a network and plan how these can be satisfied using an SDN part and a legacy part as appropriate. Returning to FIG. 1, a requirement obtained by the one or more programs executing at a controller (310) may be a requirement to encrypt end-to-end flows between clients C1, C2 and Server (FIG. 1), while also exercising tight control over the performance of these components. The one or more programs generate a plan to satisfy this requirement (320). For example, satisfying this requirement may include satisfying the subsidiary requirements of setting up a Layer-3 network consisting of C1, C2, C3 and routers R1, R2, R3, setting up Generic Routing Encapsulation (GRE) tunnels between the routers and run Open Shortest Path First (OSPF) protocol over these so they can discover routes to all Layer-3 destinations, encrypt GRE tunnels with Internet Protocol Security (IPsec) tunnels, routing encrypted traffic into the SDN network, and/or ensuring that sum of the bandwidths of all flows mapped to an SDN link do not exceed that link's capacity. This one or more programs can satisfy the plan by correctly setting values of configuration variables such as IP addresses and masks of physical and logical interfaces, mapping of GRE interfaces to physical ones, IPSec local and remote endpoints, keys, encryption and hash algorithms, OSPF areas, the forwarding rules at routers injecting encrypted traffic into the SDN, and the forwarding rules at SDN switches.

Utilizing aspects of embodiments of the present invention, referred to as DADC, program code can specify constraints and automatically resolve them using SMT solvers. The program code leverages power and scalability of control plane protocols embedded in legacy devices. In the above example, i.e., generating a plan based on obtaining a requirement to encrypt end-to-end flows between clients C1, C2 and Server, OSPF would compute Layer-3 routes without explicitly computing and installing those routes. Rather, to simplify the specification of dependencies, embodiments of the present invention utilize a specification language with a catalog of requirements that capture architecture patterns and logical structures and relationships for accomplishing common security and functionality tasks using different protocols. Examples of such requirements include, but are not limited to, IP subnets (for logical address grouping), OSPF domains (for fault-tolerant routing), Virtual Routing Redundancy Protocol (VRRP) clusters (for fault-tolerant routers), IPSec tunnels (for confidentiality), GRE tunnels (for virtual links) and access-control lists (for access-control). Requirements also include the following SDN-specific requirement: there exists a path supporting a flow, subject to routing policy and capacity constraints.

In an embodiment of the present invention, a flow is defined by a five tuple consisting of source and destination addresses and ports and a protocol. Routing policy constraints specify what devices can and cannot be on the path. Capacity constraints specify that the sum of the bandwidth of all flows mapped to a link is not greater than that link's capacity. In an embodiment of the present invention, the program code can generate requirements composed with Boolean operators (e.g., typically "AND") to form a very large class of requirements. Composition may be analogous to superposition of logical structures in network architecture planning diagrams.

Returning to FIG. 1, controller 220 compiles requirements into primitive constraints, for example, in the language of an SMT solver. These constraints may be on all the configuration variables in the network. For example, the program code compiles a requirement for SDN path finding into a constraint by generalizing an algorithm to compute shortest paths with SAT 2. The program code executing at controller 220 (e.g., a DADC controller) uses the SMT solver to find a solution in abstract form and transforms it into the vendor-specific configuration scripts (e.g., Configuration Implementing Requirements 230, FIG. 2) for each device in the network. In an embodiment of the present convention, program code of the controller 220 then applies these scripts to the devices over a control network that can either be out-of-band or in-band. For legacy devices, DADC uses SNMP or SSH depending on vendor support. In an embodiment of the present invention, for SDN devices, DADC generates a Python script that is executed by the Pox controller. For example, the controller 220 may read the solution file and apply the forwarding rules to the switches using Openflow.

In an embodiment of the present convention, the program code may also solve other configuration-related problems, including but not limited to: diagnosis, repair, verification and moving-target defense by formulating them as constraint-satisfaction problems. In an embodiment of the present invention, the program code also performs distributed configuration by building on the total-ordering guarantees of group communication protocols. Embodiments of the present invention provide a compositional framework for specifying and synthesizing a wide range of hybrid networks. Algorithms for synthesizing networks satisfying new requirements can be included in the DADC requirement catalog provided they can be encoded as a constraint satisfaction problem, for example, by encoding constraints into an SMT language and applying them in response to requirements obtained by the program code at a controller.

Figure 4:
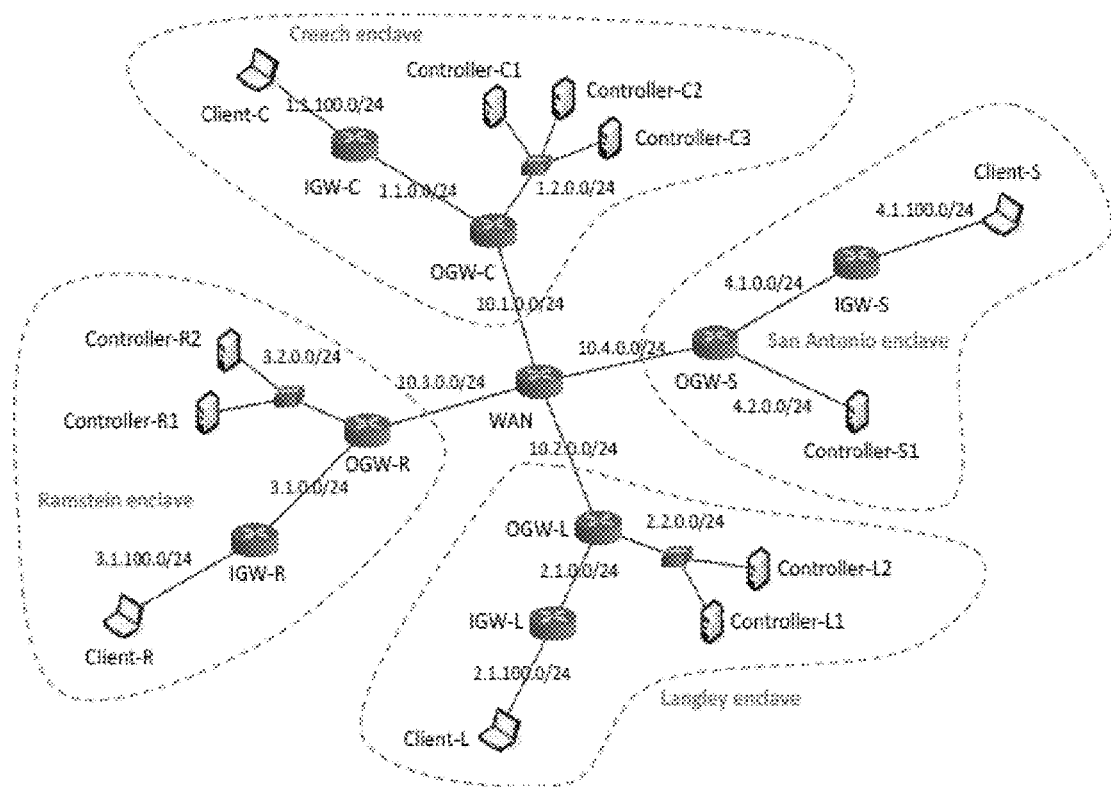
FIG. 4 is an example of a distributed architecture utilized by some embodiments of the present invention.

FIG. 4 is an example of a distributed architecture utilized by some embodiments of the present invention. In an embodiment of the present invention, as seen in FIG. 4, components or a hybrid network are partitioned into enclaves, each with a separate controller. The network in FIG. 4 is just one example of a network partitioned into enclaves and the advantages of these network configuration are explained further in the discussion of FIG. 5.

Figure 5:
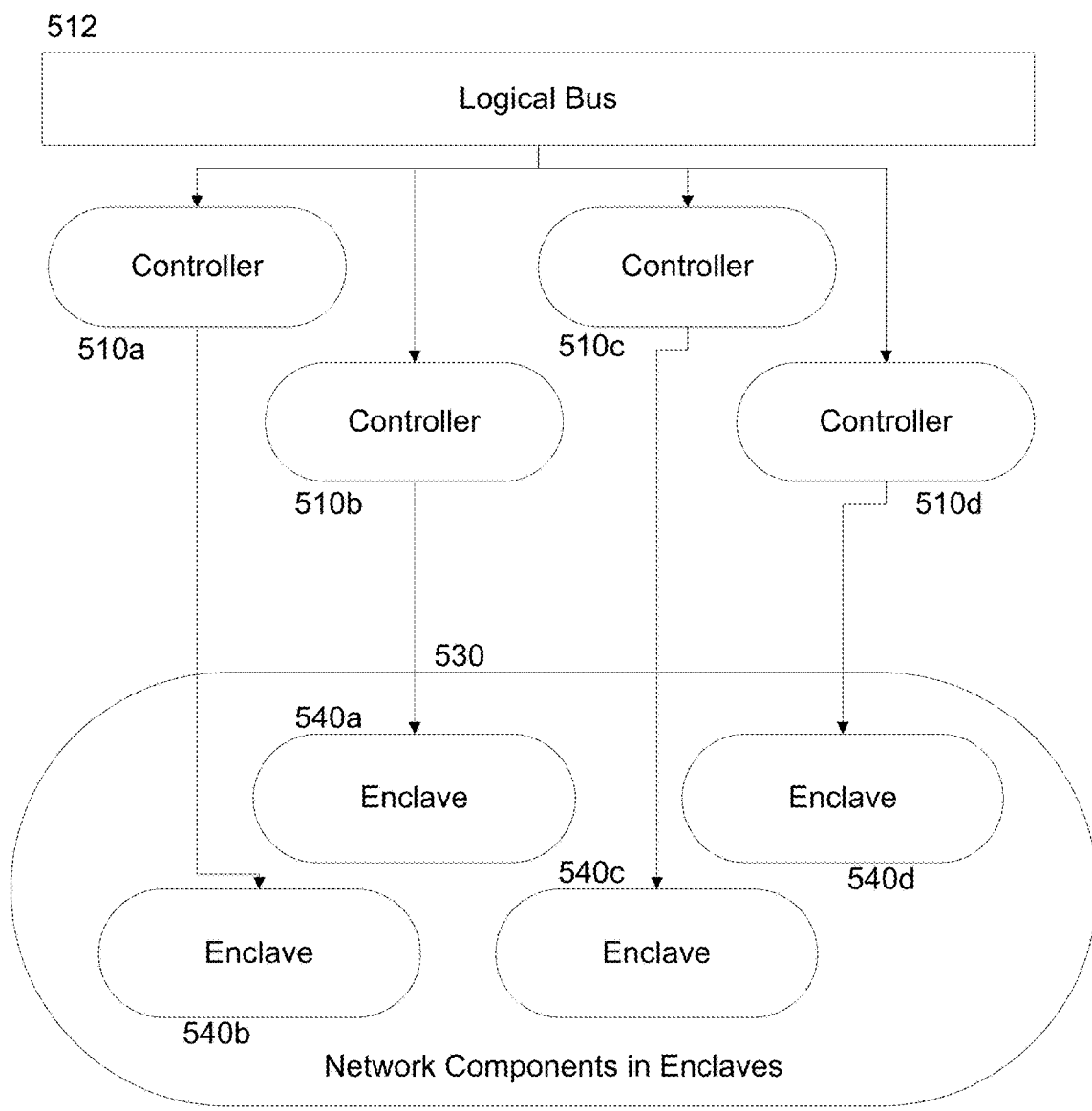
FIG. 5 is an example of a distributed architecture utilized by some embodiments of the present invention.

FIG. 5 is an example of a distributed architecture utilized by some embodiments of the present invention. In an embodiment of the present invention, as seen in FIG. 5, components of a hybrid network 530 are partitioned into enclaves 540a-540d, each with a separate controller 510a-510d. Each controller 510a-510d, which may be a DADC controller, obtains security and functionality requirements from a logical bus 512.

Returning to FIG. 5, in an embodiment of the present invention, message types conveying these requirements from the logical bus 512 include, but are not limited to: new requirement, component status, and/or moving-target defense. Each individual controller 510a-510d may utilize an in-band control channel to convey configuration information to elements in its respective enclave 540a-540d. In an embodiment of the present invention, the controllers solve dependencies between dynamic state and configurations, generate new configurations, and apply to components in their enclaves. In an embodiment of the present invention, controller action consistency is ensured by total-ordering of group communication protocols, and determinism of SAT/SMT (Boolean Satisfiability Problem/Satisfiability Modulo Theories) solvers. Consistency is maintained between the controllers as, in an embodiment of the present invention, they execute the configurations in the same order such to keep the components in all enclaves in sync and accessible to each other.

Advantages provided by an embodiment of the present invention include, but are not limited to, specification of hybrid network requirements, automated configuration generation for Linux, SDN, CORE and Mininet, hybrid network set up in minutes (rather than days), encrypted reachability between Clients and Servers, visualization of logical structures, visualization of existing configurations.

Figure 8:
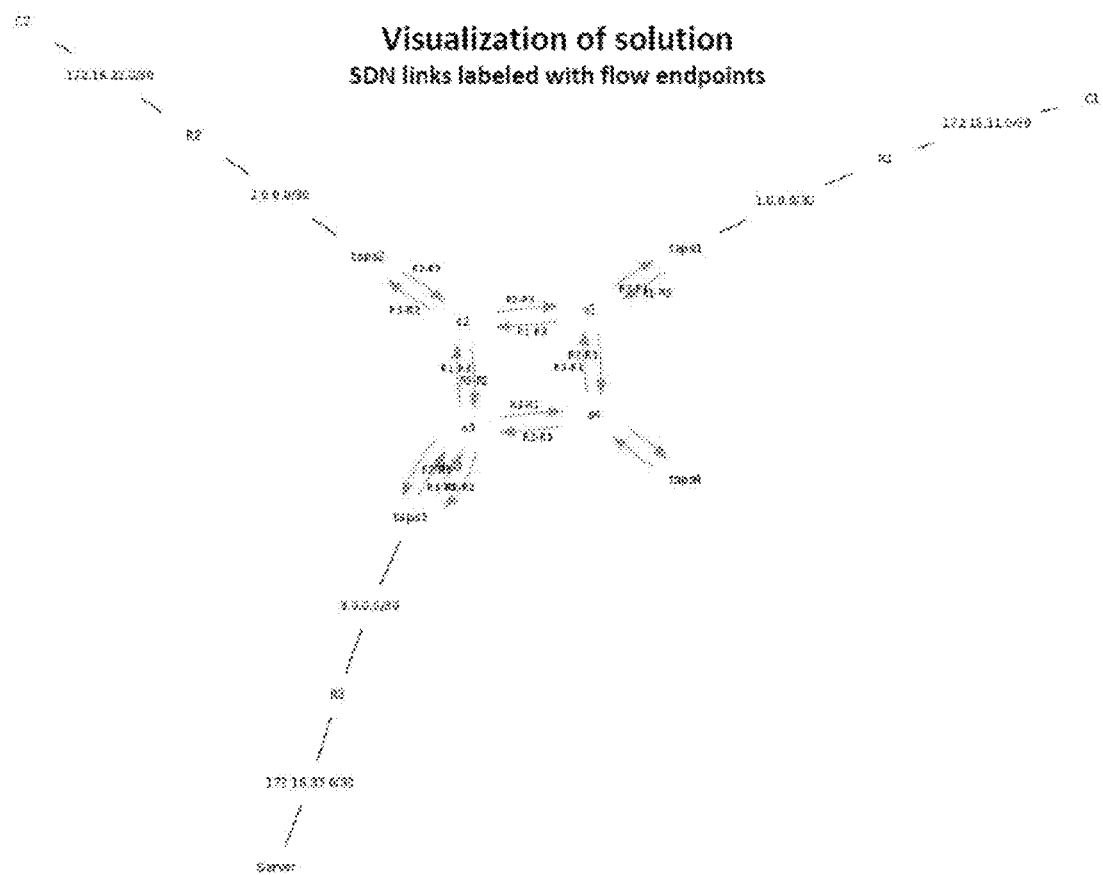
Figure 9:
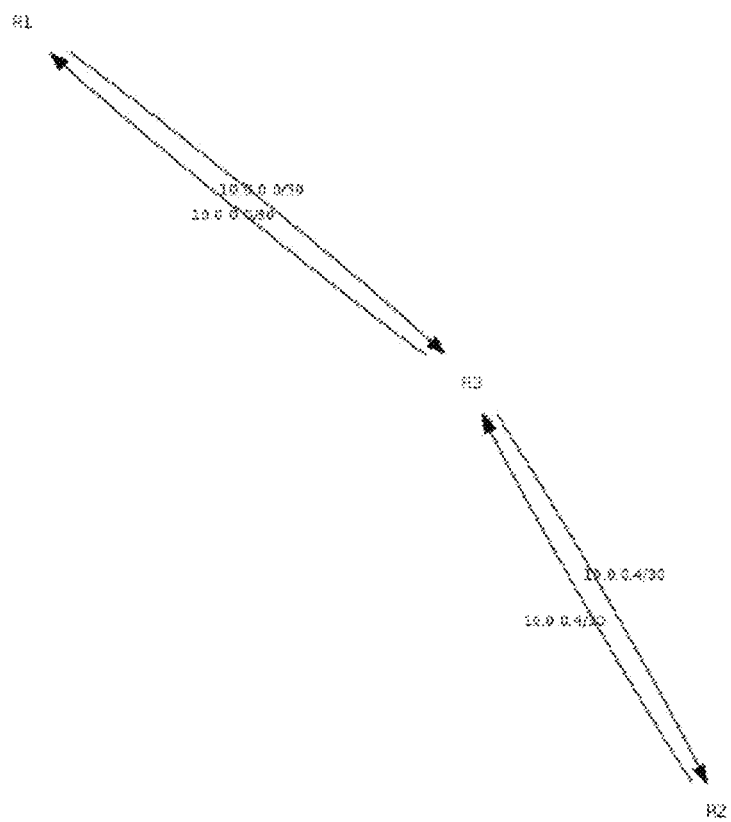

FIGS. 6-11 illustrate certain functionalities of various embodiments of the present invention. FIG. 6 depicts-specifying a hybrid network in DADC. Note that the example network utilized is the hybrid network in FIG. 1. FIG. 7 depicts that the program code comprising a constraint solver, in an embodiment of the present invention, automatically generates configuration variables. FIG. 8 depicts the visualization of a configuration solution (with SDN links labeled with flow endpoints) generated by the program code. FIG. 9 depicts a GRE/IPSec visualization of a given hybrid network in accordance with an embodiment of the present invention. FIG. 10 depicts platform-specific configurations for Linux and CORE automatically generated by the program code (e.g., executed at a controller) in an embodiment of the present invention. FIG. 11 depicts SDN and Mininet configurations that were automatically generated by program code in an embodiment of the present invention.

As explained herein, embodiments of the present invention (sometimes referred to as DADC) can take a plan and synthesize values of (both legacy and SDN) configuration variables to implement the plan. Embodiments of the present invention represent an advantage over present methods of configuration because this synthesis is inherently hard. Requirements induce a very large number of complex constraints between configuration variables within and across multiple components and protocol layers. For example, IPSec tunnel set up requires that the key and encryption and hash algorithms at both endpoints be identical, and that the peer values be symmetric. GRE packets must be routed into the IPSec tunnel for encryption. SDN forwarding rules must ensure reachability between routers, and be consistent with bandwidth and capacity constraints. Thus, constraints cannot be resolved independently of each other because of shared variables. Arguably, search spaces are astronomical. Thus, manual resolution of these constraints is infeasible. Attempts to do so, as with current practice, cause large numbers of configuration errors. Thus, embodiments of the present invention provide automatic constraint solving and configuration plan generation without this overhead.

Figure 12:
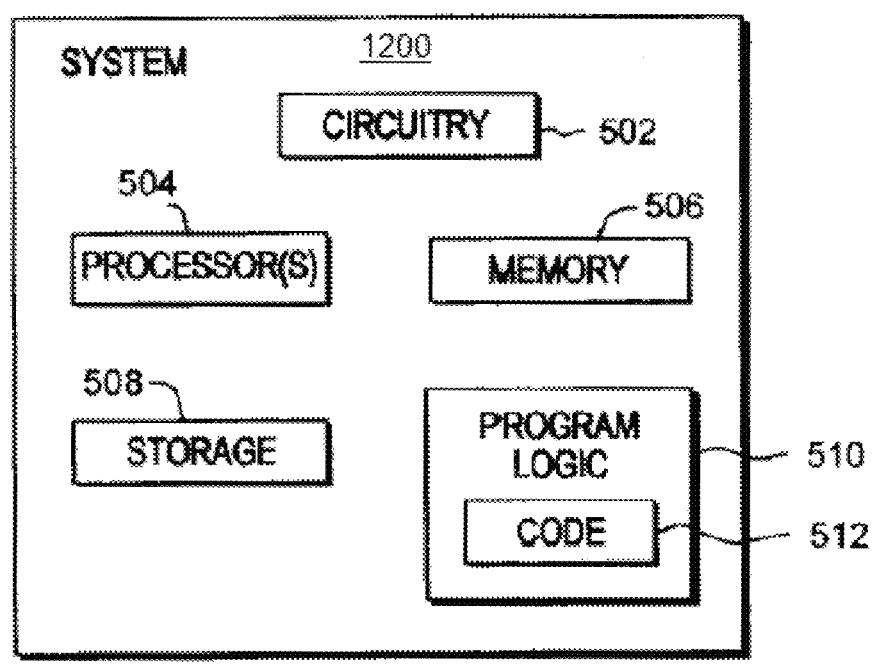
FIG. 12 depicts a computer system configured to perform an aspect of an embodiment of the present invention.
Figure 13:
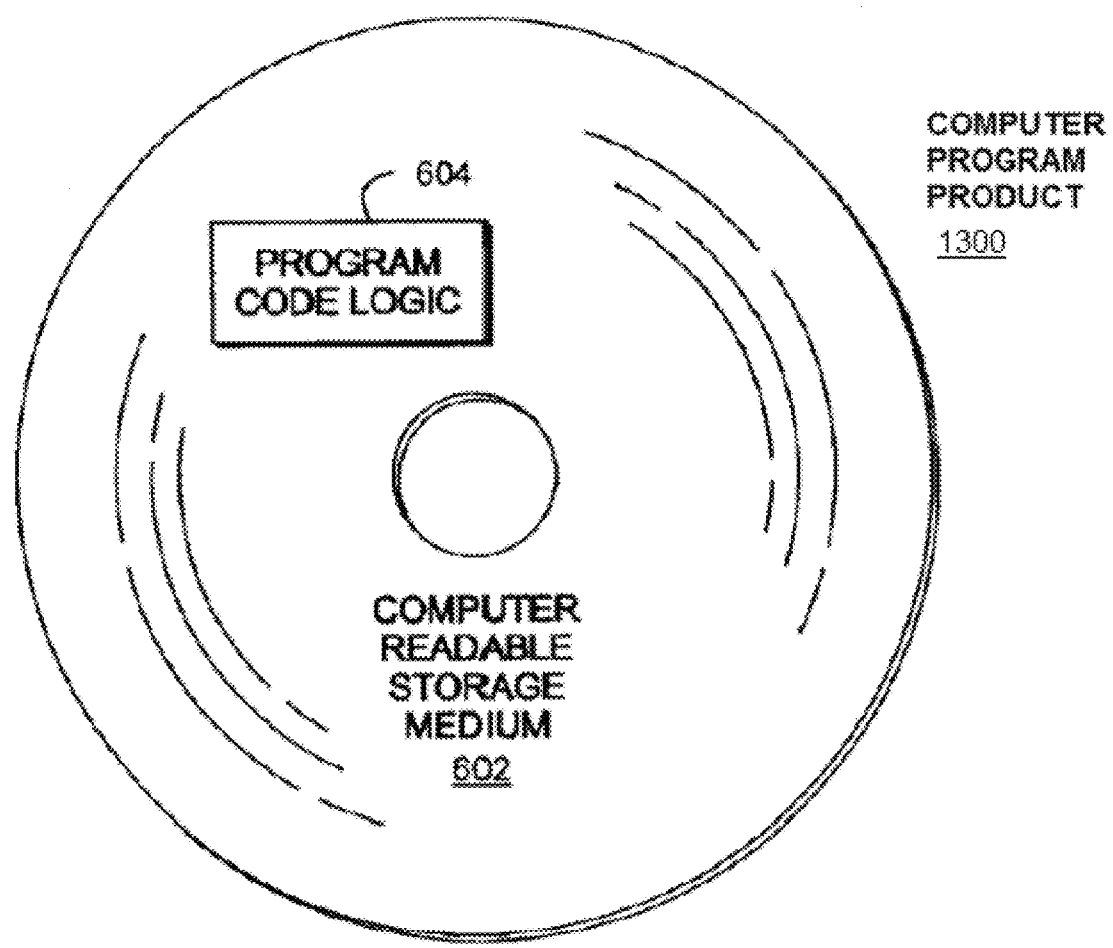
FIG. 13 depicts a computer program product incorporating one or more aspects of the present invention.

FIG. 12 and FIG. 13 are relevant to the nodes executing program code discussed in this disclosure, including the controller 220 (FIG. 2). FIG. 12 illustrates a block diagram of a resource 1200 in computer system, such as a controller. Returning to FIG. 12, the resource 1200 may include a circuitry 502 that may in certain embodiments include a microprocessor 504. The computer system 1200 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 1200 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 13 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 1200 to execute software, computer-readable code or instructions, does not limit where this code can be stored. Referring to FIG. 13, in one example, a computer program product 1300 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
   obtaining, by one or more processors, at a first controller communicatively coupled to components of a hybrid network, a requirement for the hybrid network, wherein the components of the hybrid network comprise a first component type and a second component type, wherein the first component type and the second component type are configured utilizing different protocols;

responsive to obtaining the requirement, generating, by the one or more processors, based on the requirement, a plan to configure at least one component of the first component type and at least one component of the second component type;

configuring, by the one or more processors, the at least one component of the first component type according to a first portion of the plan by utilizing a security protocol over an unsecured connection; and configuring, by the one or more processors, the at least one component of the second component type according to the second portion of the plan, wherein the at least one component of the first component type comprises a legacy component and the at least one component of the second component type comprises a software-defined networking component, and wherein the legacy component is a layer 3 component, wherein the configuring comprises:

transmitting, by the one or more processor, to a controller of components of the second component type in the hybrid network, a second portion of the plan, wherein the controller configures the at least one component of the second component type according to the second plan portion of the plan, upon receipt of the second portion of the plan.

2. The method of claim 1, further comprising:
obtaining, by the one or more processors, based on the configuring of the at least one component of the first component type and the configuring of at least one component of the second component type, configuration and state information from the at least one component of the first component type and the at least one component of the second component type.

3. The method of claim 1, wherein the plan comprises configuration implementing requirements for the at least one component of the first component type and the at least one component of the second component type.

4. The method of claim 3, wherein the generating the plan comprises:
converting, by the one or more processors, the requirement into a primitive constraint;
utilizing, by the one or more processors, a simultaneous multi-threading solver to find a solution in abstract form for the primitive constraint; and
transforming, by the one or more processors, the solution into a configuration script.

5. The method of claim 4, wherein the configuring the at least one component of the first component type and the configuring the at least one component of the second component type, comprises applying, the one or more processors, the configuration script to the at least one component of the first component type and the configuring the at least one component of the second component type.

6. The method of claim 4, wherein the primitive constraint comprises at least one of: a control constraint, a capacity constraint, a bandwidth constraint or a routing policy constraint.

7. The method of claim 1, wherein the generating the plan further comprises:
utilizing, by the one or more processors, a specification language with a catalog of requirements, wherein the specification language captures architecture patterns, logical structures, and relationships of the components of the hybrid network;
locating, by the one or more processors, the requirement in the catalog of requirements; and
utilizing the architecture patterns, the logical structures, and the relationships of the components of the hybrid network relevant to the requirement to formulate security and functionality tasks for configuring the at least one component of the at least one component of the first component type and the at least one component of the second component type to enable the hybrid network to meet the requirement.

8. The method of claim 1, wherein the generating comprises simultaneously generating the first portion of the plan and the second portion of the plan.

9. A computer program product comprising:
a non-transitory computer readable storage medium readable by one or more processors and storing instructions for execution by the one or more processors for performing a method comprising:
obtaining, by the one or more processors, at a first controller communicatively coupled to components of a hybrid network, a requirement for the hybrid network, wherein the components of the hybrid network comprise a first component type and a second component type, wherein the first component type and the second component type are configured utilizing different protocols;
responsive to obtaining the requirement, generating, by the one or more processors, based on the requirement, a plan to configure at least one component of the first component type and at least one component of the second component type;
configuring, by the one or more processors, the at least one component of the first component type according to a first portion of the plan by utilizing a security protocol over an unsecured connection; and
configuring, by the one or more processors, the at least one component of the second component type according to the second portion of the plan, wherein the at least one component of the first component type comprises a legacy component and the at least one component of the second component type comprises a software-defined networking component, and wherein the legacy component is a layer 3 component, wherein the configuring comprises:
transmitting, by the one or more processor, to a controller of components of the second component type in the hybrid network, a second portion of the plan, wherein the controller configures the at least one component of the second component type according to the second plan portion of the plan, upon receipt of the second portion of the plan.

10. The computer program product of claim 9, further comprising:
obtaining, by the one or more processors, based on the configuring of the at least one component of the first component type and the configuring of at least one component of the second component type, configuration and state information from the at least one component of the first component type and the at least one component of the second component type.

11. The computer program product of claim 9, wherein the plan comprises configuration implementing requirements for the at least one component of the first component type and the at least one component of the second component type.

12. The computer program product of claim 11, wherein the generating the plan comprises:
converting, by the one or more processors, the requirement into a primitive constraint;
utilizing, by the one or more processors, a simultaneous multi-threading solver to find a solution in abstract form for the primitive constraint; and
transforming, by the one or more processors, the solution into a configuration script.

13. The computer program product of claim 12, wherein the configuring the at least one component of the first component type and the configuring the at least one component of the second component type, comprises applying, the one or more processors, the configuration script to the at least one component of the first component type and the configuring the at least one component of the second component type.

14. The computer program product of claim 12, wherein the primitive constraint comprises at least one of: a control constraint, a capacity constraint, a bandwidth constraint or a routing policy constraint.

15. The computer program product of claim 9, wherein the generating the plan further comprises:
utilizing, by the one or more processors, a specification language with a catalog of requirements, wherein the specification language captures architecture patterns, logical structures, and relationships of the components of the hybrid network;
locating, by the one or more processors, the requirement in the catalog of requirements; and
utilizing the architecture patterns, the logical structures, and the relationships of the components of the hybrid network relevant to the requirement to formulate security and functionality tasks for configuring the at least one component of the at least one component of the first component type and the at least one component of the second component type to enable the hybrid network to meet the requirement.

16. A system comprising:
a memory;
one or more processors in communication with the memory; and
program instructions executable by the one or more processors via the memory to perform a method, the method comprising:
obtaining, by the one or more processors, at a first controller communicatively coupled to components of a hybrid network, a requirement for the hybrid network, wherein the components of the hybrid network comprise a first component type and a second component type, wherein the first component type and the second component type are configured utilizing different protocols;
responsive to obtaining the requirement, generating, by the one or moreprocessors, based on the requirement, a plan to configure at least one component of the first component type and at least one component of the second component type;
configuring, by the one or more processors, the at least one component of the first component type according to a first portion of the plan by utilizing a security protocol over an unsecured connection; and
configuring, by the one or more processors, the at least one component of the second component type according to the second portion of the plan, wherein the at least one component of the first component type comprises a legacy component and the at least one component of the second component type comprises a software-defined networking component, and wherein the legacy component is a layer 3 component, wherein the configuring comprises:
transmitting, by the one or more processor, to a controller of components of the second component type in the hybrid network, a second portion of the plan, wherein the controller configures the at least one component of the second component type according to the second plan portion of the plan, upon receipt of the second portion of the plan.

* * * * *

UNITED STATES PATENT AND TRADEMARK OFFICE
CERTIFICATE OF CORRECTION

PATENT NO.         : 10,250,444 B2                                    Page 1 of 1
APPLICATION NO.    : 15/199018
DATED              : April 2, 2019
INVENTOR(S)        : Sanjai Narain It is certified that error appears in the above-identified patent and that said Letters Patent is hereby corrected as shown below:

In the Claims

Column 16, Line 16: Claim 16, Delete "moreprocessors," and insert -- more processors, --

Signed and Sealed this
Fourth Day of June, 2019

Andrei Iancu
*Director of the United States Patent and Trademark Office*